Aug. 23, 1927.
P. H. REID
1,639,898
INTERNAL COMBUSTION ENGINE
Filed April 29, 1926
2 Sheets-Sheet 1
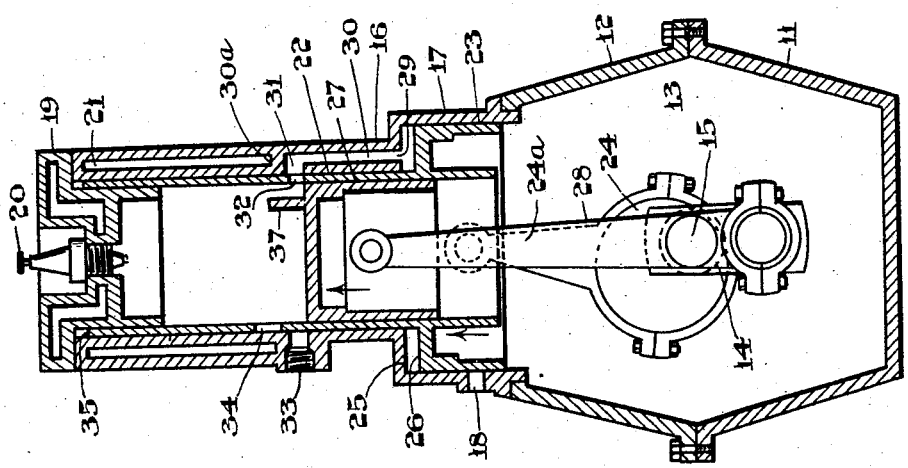
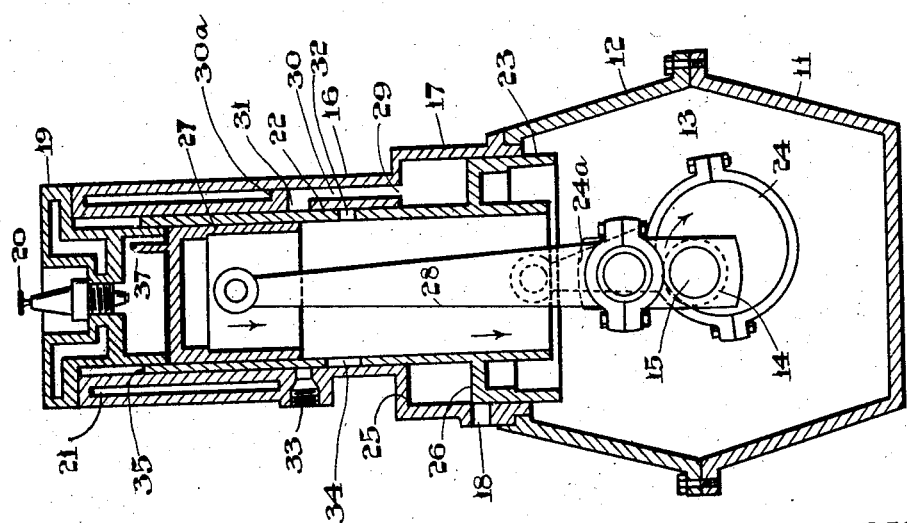
INVENTOR
Percy H. Reid.
BY Fetherstonhaugh & Co
ATTORNEYS Aug. 23, 1927.

P. H. REID 1,639,898

INTERNAL COMBUSTION ENGINE

Filed April 29, 1926    2 Sheets-Sheet 2

INVENTOR
Percy H. Reid.

BY Fetherstonhaugh & Co
ATTORNEYS

Patented Aug. 23, 1927.

1,639,898

UNITED STATES PATENT OFFICE.

PERCY H. REID, OF MONTREAL, QUEBEC, CANADA, ASSIGNOR OF ONE-HALF TO ARTHUR S. PIERS, OF MONTREAL, CANADA.

INTERNAL-COMBUSTION ENGINE.

Application filed April 29, 1926. Serial No. 105,570.

This invention relates to new and useful improvements in internal combustion engines, and the object of the invention is to provide a highly efficient engine of the sleeve valve type which will have a minimum number of moving parts, thereby decreasing the initial and maintenance cost of engines of this class.

Another object is to provide an engine of the sleeve valve type in which the intake and exhaust ports will be so positioned that a complete charge is admitted and retained in the combustion chamber so that the resulting compression will materially increase the efficiency of the engine over other engines of a similar class.

A further object is to provide an internal combustion engine which will have simple and positive mechanism for compressing the gaseous mixture and for delivering the same under pressure into the ignition or power cylinder, at highest efficiency.

In my invention, I provide an internal combustion engine working on a two stroke cycle in which a single sleeve or liner, reciprocating in the cylinder has two sets of ports, one for allowing compressed gases to pass into the combustion chamber and the other to allow the burnt gases to be discharged therefrom. The sleeve is actuated by eccentrics cranks, or the like, secured to the main shaft, or formed thereon. The aforementioned ports are so positioned that the exhaust port is almost closed, while the intake port is opening. The piston works within the sleeve and the motion imparted to the sleeve is approximately half the length of the piston stroke. The sleeve is provided with an enlarged end working in an enlarged chamber formed in the bottom of the cylinder so that the gases, drawn into said chamber from a carburetor or other mixing device, are compressed therein, and said compressed gases may be fed to the combustion chamber. The exhaust port is so positioned that the upward action of the sleeve has opened and is closing this port as the inlet port is just opening. The inlet port is opened by the upward action of the sleeve and at the same time the gases in the enlarged chamber are forced from said chamber through the by-pass and inlet port into the combustion chamber and as the sleeve reaches the end of its upward stroke, the inlet port is being closed by the upward action of the piston.

In the drawings which illustrate my invention;

Figure 1 is a sectional elevation of one cylinder of my improved engine with the piston shown at the top of its stroke.

Figure 2 is a sectional elevation of the cylinder shown in Figure 1 but with the piston at the bottom of its stroke.

Figure 3:
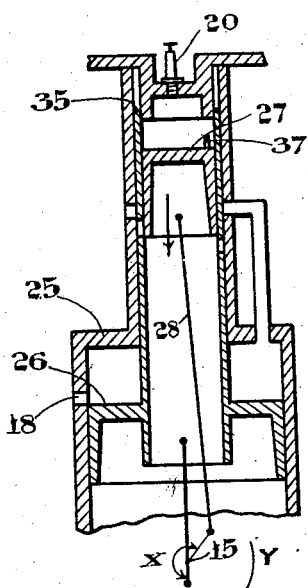
Figures 3, 4, 5 and 6, are diagrammatic illustrations of the engine with the component parts at different positions during the cycle of operations of the engine.

Referring more particularly to the drawings 11 designates the lower crank case and 12 the upper crank case, which are secured together by any suitable means (not shown) to form an oil tight chamber 13. Rotatably mounted in bearings 14 is the crank shaft 15. Secured to the upper crank case is the cylinder 16 which is of the two diameter type, the larger or lower part 17 of said cylinder being adapted to receive gas through an inlet port 18 formed in the wall, said port being connected to a carburetor or such like gas or fuel mixing device (not shown). A cap or cover 19 is secured to the upper end of the cylinder and mounted in said cap is the spark plug 20. Water cooling jackets 21 may be formed in the cylinder walls and cap or cover, in the usual manner. Slidably mounted in the cylinder and engaging with the walls thereof, is the two diameter sleeve valve 22, the lower or larger portion 23 of which is adapted to engage with the inner wall of part 17 of the cylinder. The sleeve is connected to the crank shaft by means of the eccentric 24 and eccentric rod 24$^a$ in such a manner that when said sleeve is at the bottom of its stroke, port 18 is uncovered to allow gas from the carburetor to pass into the space between the shoulder or wall 25 of the cylinder, and the upper surface 26 of the portion 23 of the sleeve. Slidably mounted within and contacting with the inner wall of the sleeve is the driving piston 27 which is connected to the crank shaft by means of the connecting rod 28 in such a manner that it reciprocates within the sleeve. An outlet port 29 for the gases, formed in the wall 25 of the cylinder is connected by a by-pass 30 to a compressed gas inlet port 31, formed in the wall 30ª of the cylinder, said port 31 being so positioned that when the piston 27 is at the bottom of its stroke, its uppermost surface will coincide with the lower edge of said port 31. A compressed gas inlet port 32 is also formed in the wall of the sleeve in such a position that when the piston is at the bottom of its stroke the port 32 will register with port 31 allowing the gases to pass into the combustion chamber between the cap and the piston. An exhaust port 33 is formed in the wall of the cylinder in diametrically opposite alignment with the inlet port 31 and in the wall 30ª. An exhaust port 34 is formed in the wall of the sleeve, said port being positioned nearer the cap end 35 of the sleeve than the port 32, so that almost all of the exploded or burnt gases in the combustion chamber pass through the port 34 before the inlet port is uncovered. It will be noticed in operation that the stroke of the sleeve is approximately half that of the piston and that the downward movement of the sleeve is approximately 220° behind that of the piston, this movement being accomplished by making the angle X between crank and the eccentric equal to approximately 220° when the crank shaft is moving in the direction indicated by arrow Y, but this angle may be altered to suit the requirements of the engine according to the ratio between the stroke of the piston and the sleeve, also to adapt the engine for different grades of fuel.

In operation it will be seen from Figure 3, that the piston is being driven downwardly by the explosion of the gases in the combustion chamber and the inlet port 18 is uncovered to allow gases from the mixing valve or carburetor, to be drawn into the space between the shoulder or wall 25 of the cylinder and the surface 26 of the sleeve.

Figure 4:
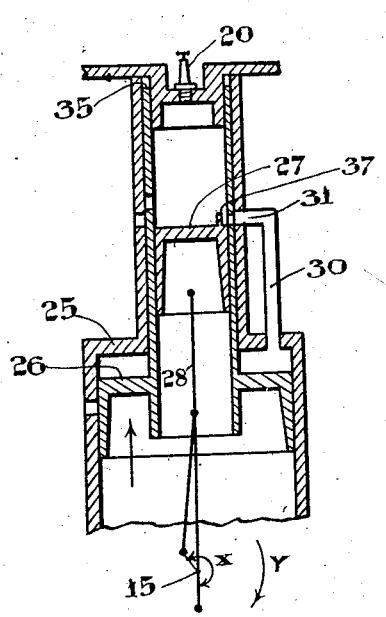

In Figure 4 the piston has reached the bottom of its stroke, and sleeve has almost reached the top of its stroke, and is in such a position that the gases pass freely into the combustion chamber through the intake port in the wall of the valve or sleeve. It will be seen that the sleeve is driving the gases in through the port as the gases contained between the shoulder 25 and the face 26 are forced through the by-pass 30. It will be noticed that the exhaust port has been opened and has again closed before the intake port opens to its full extent. Before the exhaust port closes, the inlet port 31 opens slightly, so that the inrushing motion of the fresh charge of the compressed gaseous mixture assists in driving the burnt gases from the cylinder, and to assist in preventing loss of said mixture a baffle 37 may be provided extending upwardly from the piston and into the explosion chamber to deflect the inrushing gaseous mixture while the burnt gases are driven out from the combustion chamber.

Figure 5:
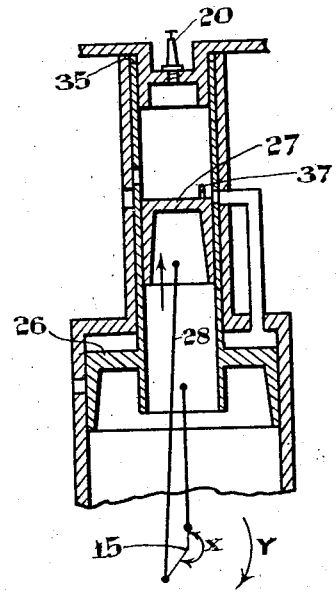
Figure 6:
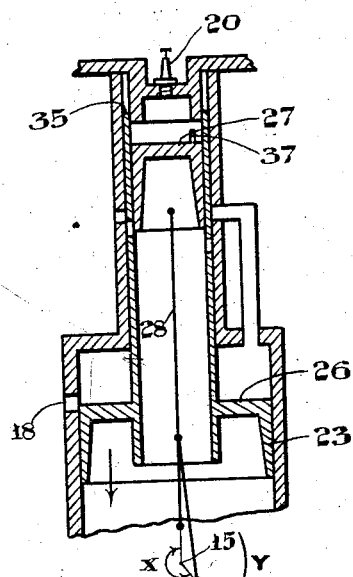

In Figure 5, I have shown the sleeve at the top of its stroke and the piston again moving towards the top of the cylinder. It will be seen that from this point in the cycle of operation to that shown in Figure 6, the sleeve valve and the piston are moving in opposite directions, thereby providing a highly efficient means for cutting off the supply of gas to the combustion chamber.

The device has only one moving part to control the supply of gas to the cylinder and the exhaust of the burnt gases therefrom, and forms a device which is economical to manufacture, install and repair.

By arranging the movement of the sleeve so that it will be more than 180° behind that of the piston, the gases are compressed in the auxiliary or enlarged chamber before and during the opening of the inlet port to the combustion chamber, which is a very desirable feature in engines of this class, as it provides a supercharging feature by merely making the displacement of the auxiliary or enlarged piston 23 greater than the displacement of the power piston 27.

Having thus described my invention, what I claim is;—

1. In an internal combustion engine, a cylinder of two diameters having a combustion chamber and a fuel feed chamber for compressing a charge of gas therein, a sleeve valve of two diameters slidably mounted in said cylinder, a piston slidably mounted in said sleeve, fuel inlet and exhaust ports formed in the sleeve and the wall of the cylinder and positioned so that the exhaust ports are closing as the fuel inlet ports are beginning to open, and means operating the sleeve and the piston so that the compressed gases in the enlarged feed chamber are forced under pressure into the combustion chamber during the opening of the intake ports and when the piston has traveled only a slight distance at the beginning of the compression stroke.

2. In an internal combustion engine, a cylinder of two diameters, a slidable valve sleeve mounted therein and having corresponding external diameters and a bore of one diameter, a piston slidably mounted in the bore of the sleeve, diametrically opposite intake and exhaust ports formed in the wall of the smaller diameter of the cylinder, intake and outlet ports formed in the wall of the larger diameter of the cylinder, means connecting the outlet with the first mentioned inlet, intake and exhaust ports in the sleeve, the positioning of the last mentioned ports being such that when the exhaust port is closing the intake port is beginning to open, a crank shaft, means connecting the crank shaft with the piston, means connecting the sleeve with the crank shaft so that its movement will be over 180° behind that of the piston connection.

3. In an internal combustion engine, a cylinder of two diameters a slidable valve sleeve mounted therein and having corresponding external diameters and a bore of one diameter, a piston slidably mounted in the bore of the sleeve, a crank shaft, compressed fuel inlet and outlet ports formed in the wall of the sleeve and in the cylinder's smaller diameter, so positioned and controlled that as the exhaust ports are closing the intake ports are beginning to open, an inlet formed in the larger diameter of the cylinder, adapted to be opened when the sleeve is at the bottom of its stroke, an outlet port from said larger diameter of the cylinder and connected to the inlet port in the smaller diameter of the cylinder, means connecting the piston to the crank shaft, and means connecting the sleeve to the crank shaft so that the gas compressed within the larger part of the cylinder is forced under continuous pressure through the intake ports in the sleeve and the cylinder during outward movement of the sleeve and when the piston has traveled only a slight distance at the beginning of the compression stroke.

4. In an internal combustion engine, a two diameter cylinder forming an enlarged gas chamber and a combustion chamber, a sleeve valve of the two diameter type slidably mounted in said cylinder, an inlet port in the enlarged chamber adapted to be fully open when the sleeve is at the bottom of its stroke, an inlet port in the wall of the combustion chamber, an outlet in the enlarged chamber communicating with said inlet port, a piston slidably mounted in the bore of the sleeve, an inlet port formed in the wall of the sleeve and adapted to register with said inlet port in the cylinder when the piston is at the bottom of its stroke and the sleeve almost at the top of its stroke, an exhaust port in the wall of the combustion chamber in diametrically opposite relationship with the intake port, an exhaust port in the sleeve adapted to register with the exhaust port in the cylinder and to open and close on the upward movement of the sleeve, said last mentioned ports being so positioned that they are closing as the inlet ports in the cylinder and sleeve are opening.

5. A two cycle engine equipped with a sleeve valve having fuel inlet and exhaust ports registrable with corresponding fuel inlet and exhaust ports formed in the power cylinder, means including said valve for effecting and controlling the opening and closing of said inlet and exhaust ports in such timed relation to piston movement that the exhaust ports open and close during a relatively slight travel of the power piston at the end of the power stroke while the inlet ports begin to open just prior to closure of the exhaust ports and close when the piston has traveled only a slight distance at the beginning of the compression stroke, and a fuel pump having a piston arranged and operated to compress and deliver fuel to the power cylinder during the period that the inlet ports remain open.

6. A two cycle engine equipped with a reciprocal sleeve valve having fuel inlet and exhaust ports registrable with corresponding fuel inlet and exhaust ports formed in the power cylinder, means including said valve for effecting and controlling the opening and closing of the inlet and exhaust ports in such timed relation to piston movement that the exhaust ports open and close during a relatively slight travel of the power piston at the end of the power stroke while the inlet ports begin to open just prior to closure of the exhaust ports and close when the piston has traveled only a slight distance at the beginning of the compression stroke and a fuel pump comprising a pump piston fixed to the sleeve valve and operating in a pump cylinder formed integral with the power cylinder and having a suitable fuel inlet, said pump piston being movable with the sleeve valve to draw in a charge of fuel during the compression stroke of the power piston and to effect compression and delivery of the fuel charge to the power cylinder during the period that the inlet ports remain open.

7. A two cycle engine having aligned fuel inlet and exhaust ports formed in opposite wall portions of the power cylinder and positioned so that the inner edges of said ports approximately coincide with the compression surface of the power piston when the latter is at the end of the power stroke, a reciprocal sleeve valve operating between the cylinder and the piston and provided with fuel inlet and exhaust ports arranged to register, at times, with the corresponding ports of the cylinder, said valve ports being relatively staggered to position the exhaust port a predetermined distance nearer to the head or outer end of the valve, means for reciprocating the valve oppositely to the piston including provision for causing the valve to have a limited movement in the same direction as the piston at the very beginning of the compression stroke, said means being timed to cause the exhaust ports to open and close during a slight travel of the piston at the end of the power stroke, to cause the inlet ports to begin to open just prior to closure of the exhaust ports and before the piston has reached the end of the power stroke and to cause said inlet ports to be closed by the valve and the piston when the latter has traveled only a slight distance outwardly at the beginning of the compression stroke and a fuel pump comprising a pump cylinder formed by enlarging the inner end of the power cylinder and having a fuel inlet and a fuel outlet, a conduit formed in the power cylinder and establishing communication between the fuel inlet thereof and the pump outlet and a pump piston operating in said pump cylinder and formed by an enlargement at the inner end of the valve, said pump piston functioning to draw a charge of fuel into the pump cylinder during the inward movement of the sleeve and to compress and deliver the charge of fuel to the power cylinder during the outward movement of the sleeve.

In witness whereof I have hereunto set my hand.

PERCY H. REID.